(12) United States Patent
Goel

(10) Patent No.: US 10,565,561 B2
(45) Date of Patent: Feb. 18, 2020

(54) TECHNIQUES FOR IDENTIFYING AND RECOMMENDING SKILLS

(71) Applicant: Microsoft Technology Licensing, LLC, Redmond, WA (US)

(72) Inventor: Mudit Goel, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 829 days.

(21) Appl. No.: 14/502,993

(22) Filed: Sep. 30, 2014

(65) Prior Publication Data

US 2016/0092998 A1 Mar. 31, 2016

(51) Int. Cl.
G06Q 10/06 (2012.01)
G06Q 50/20 (2012.01)
G06Q 10/10 (2012.01)
G06Q 50/00 (2012.01)

(52) U.S. Cl.
CPC ......... *G06Q 10/1053* (2013.01); *G06Q 50/01* (2013.01); *G06Q 10/063112* (2013.01); *G06Q 10/105* (2013.01)

(58) Field of Classification Search
USPC ........................................ 705/320, 321, 328
See application file for complete search history.

(56) References Cited

U.S. PATENT DOCUMENTS

| 6,078,935 | A | 6/2000 | Nielsen |
| 8,398,490 | B1 | 3/2013 | Phelon et al. |
| 8,650,177 | B2 | 2/2014 | Skomoroch et al. |
| 9,342,592 | B2 | 5/2016 | Giverts et al. |
| 9,886,498 | B2 | 2/2018 | Goel et al. |
| 10,380,552 | B2 | 8/2019 | Zhang et al. |
| 2003/0220811 | A1* | 11/2003 | Fan ........................ G06Q 10/10 705/328 |
| 2005/0096973 | A1 | 5/2005 | Heyse et al. |
| 2006/0184409 | A1 | 8/2006 | Bangel et al. |
| 2007/0059671 | A1* | 3/2007 | Mitchell .............. G06Q 10/105 434/107 |

(Continued)

OTHER PUBLICATIONS

Singhal et al. A Comparative Study of Data Clustering Algorithms. International Journal of Computer Applications (0975-8887). Dec. 2013. [Retrieved on: Aug. 6, 2018]. Retrieved from internet: <URL:https://pdfs.semanticscholar.org/e4c6/4bf2d19de8eead2999e0808ef17dfe93ff77.pdf>. entire document (Year: 2013).*

(Continued)

*Primary Examiner* — Tamara Griffin
(74) *Attorney, Agent, or Firm* — Schwegman Lundberg & Woessner, P.A.

(57) ABSTRACT

Disclosed in some examples are methods, machine readable mediums, and systems for providing a list of skills a member should learn in order to achieve a particular goal. The system may provide a user interface to the member of the social networking service. Through the user interface, the member may select one or more goals that they wish to achieve. Based upon these goals, the list of skills associated with that goal may be determined—this list is a goal set of skills. The goal set of skills may be compared to the member's current skills. Skills in the list of goal skills that the member does not already possess may be recommended to the member.

24 Claims, 11 Drawing Sheets

(56) References Cited

U.S. PATENT DOCUMENTS

| | | | |
|---|---|---|---|
| 2007/0067441 A1* | 3/2007 | Pomerantz | G06Q 10/06 709/224 |
| 2007/0190504 A1 | 8/2007 | Schwartz et al. | |
| 2007/0203710 A1* | 8/2007 | Habichler | G06Q 10/00 705/320 |
| 2007/0208572 A1 | 9/2007 | Habichler et al. | |
| 2008/0052358 A1 | 2/2008 | Beaven et al. | |
| 2008/0228708 A1 | 9/2008 | Kenedy et al. | |
| 2009/0228425 A1 | 9/2009 | Goraya | |
| 2009/0276231 A1* | 11/2009 | Bazigos | G06Q 10/105 705/320 |
| 2009/0276295 A1* | 11/2009 | Dane | G06Q 10/0631 12 705/7.14 |
| 2009/0299806 A1* | 12/2009 | Lu | G06Q 10/06 705/7.28 |
| 2010/0057659 A1* | 3/2010 | Phelon | G06Q 10/00 706/46 |
| 2010/0153288 A1 | 6/2010 | Digiambattista et al. | |
| 2010/0153289 A1 | 6/2010 | Schneiderman et al. | |
| 2010/0312713 A1 | 12/2010 | Keltner | |
| 2011/0040753 A1 | 2/2011 | Knight | |
| 2011/0145747 A1 | 6/2011 | Wong et al. | |
| 2011/0185020 A1 | 7/2011 | Ramamurthy et al. | |
| 2011/0276582 A1 | 11/2011 | Schmitt | |
| 2012/0022949 A1 | 1/2012 | George | |
| 2012/0023030 A1 | 1/2012 | Jeffries | |
| 2012/0110071 A1 | 5/2012 | Zhou et al. | |
| 2012/0143921 A1 | 6/2012 | Wilson et al. | |
| 2012/0185486 A1 | 7/2012 | Voigt et al. | |
| 2012/0197733 A1* | 8/2012 | Skomoroch | G06Q 30/02 705/14.66 |
| 2012/0197863 A1 | 8/2012 | Skomoroch et al. | |
| 2012/0197993 A1 | 8/2012 | Skomoroch et al. | |
| 2012/0226623 A1 | 9/2012 | Jurney et al. | |
| 2012/0311462 A1 | 12/2012 | Devecka | |
| 2013/0006765 A1 | 1/2013 | Lee | |
| 2013/0018871 A1 | 1/2013 | Mehta et al. | |
| 2013/0018900 A1 | 1/2013 | Cheng | |
| 2013/0031090 A1 | 1/2013 | Posse et al. | |
| 2013/0046704 A1 | 2/2013 | Patwa et al. | |
| 2013/0060685 A1 | 3/2013 | Om | |
| 2013/0166466 A1 | 6/2013 | Sanger | |
| 2013/0212031 A1* | 8/2013 | Barnfield | G06Q 10/06 705/320 |
| 2013/0232171 A1 | 9/2013 | Cheng et al. | |
| 2013/0268373 A1 | 10/2013 | Grishaver | |
| 2013/0297543 A1 | 11/2013 | Treiser | |
| 2014/0025427 A1* | 1/2014 | Bastian | G06Q 30/0201 705/7.29 |
| 2014/0052656 A1 | 2/2014 | Ball | |
| 2014/0081995 A1 | 3/2014 | Martin et al. | |
| 2014/0122472 A1 | 5/2014 | Wells | |
| 2014/0136433 A1 | 5/2014 | Posse et al. | |
| 2014/0136434 A1 | 5/2014 | Posse et al. | |
| 2014/0143163 A1 | 5/2014 | Kamat et al. | |
| 2014/0143165 A1 | 5/2014 | Posse et al. | |
| 2014/0143167 A1 | 5/2014 | Cheng et al. | |
| 2014/0164416 A1 | 6/2014 | Hosseini et al. | |
| 2014/0164952 A1 | 6/2014 | Allen et al. | |
| 2014/0180943 A1 | 6/2014 | Priddy, Jr. et al. | |
| 2014/0195549 A1* | 7/2014 | Ahn | H04L 51/32 707/749 |
| 2014/0244561 A1 | 8/2014 | Cheng et al. | |
| 2014/0245184 A1 | 8/2014 | Cheng et al. | |
| 2014/0279630 A1* | 9/2014 | Andersen | G06Q 10/1053 705/321 |
| 2014/0297746 A1 | 10/2014 | Cheng et al. | |
| 2014/0379602 A1 | 12/2014 | Nelson et al. | |
| 2015/0032747 A1 | 1/2015 | Giverts et al. | |
| 2015/0127565 A1 | 5/2015 | Chevalier et al. | |
| 2015/0127567 A1* | 5/2015 | Menon | G06Q 10/1053 705/321 |
| 2015/0317759 A1* | 11/2015 | Jing | G06Q 10/10 705/328 |
| 2015/0317760 A1* | 11/2015 | Pham | G06Q 50/20 705/328 |
| 2016/0092838 A1 | 3/2016 | Hardtke et al. | |
| 2016/0117385 A1 | 4/2016 | Goel et al. | |
| 2016/0196266 A1 | 7/2016 | Merhav et al. | |
| 2016/0379170 A1* | 12/2016 | Pande | G06Q 10/06 705/321 |
| 2018/0121879 A1 | 5/2018 | Zhang et al. | |
| 2018/0121880 A1 | 5/2018 | Zhang et al. | |

OTHER PUBLICATIONS

Chowdary et al. Evaluating and Analyzing Clusters in Data Mining using Different Algorithms. International Journal of Computer Science and Mobile Computing. Feb. 2014. [Retrieved on: Aug. 6, 2018]. <URL:https://pdfs.semanticscholar.org/17f0/8687abbc93122041f37f530e4bbadb8e7990.pdf> (Year: 2014).* umn.edu. An Introduction to Cluster Analysis for Data Mining . cs.umn.edu. Oct. 2, 2000. [Retrieved on: Aug. 6, 2018]. Retrieved from internet: <URL:https://www-users.cs.umn.edu/~hanxx023/dmclass/cluster_survey_10_02_00.pdf>. entire document (Year: 2000).*

Messmer. 7 IT security skills certifications on the rise. networkworld. com. Aug. 19, 2013. [Retrieved on: Feb. 11, 2019]. Retrieved from internet: <URL:https://www.networkworld.com/article/2170044/security/7-it-security-skills-certifications-on-the-rise.html>. entire document (Year: 2013).*

"U.S. Appl. No. 13/780,116, Advisory Action dated Oct. 20, 2015", 4 pgs.

"U.S. Appl. No. 13/780,116, Appeal Decision dated Nov. 2, 2017", 12 pgs.

"U.S. Appl. No. 13/780,116, Examiner Interview Summary dated May 3, 2016", 2 pgs.

"U.S. Appl. No. 13/780,116, Final Office Action dated May 11, 2016", 9 pgs.

"U.S. Appl. No. 13/780,116, Final Office Action dated Jul. 30, 2015", 25 pgs.

"U.S. Appl. No. 13/780,116, Non Final Office Action dated Feb. 26, 2015", 26 pgs.

"U.S. Appl. No. 13/780,116, Non Final Office Action dated Dec. 3, 2015", 13 pgs.

"U.S. Appl. No. 13/780,116, Reply Brief filed Jan. 4, 2017", 3 pgs.

"U.S. Appl. No. 13/780,116, Response filed Apr. 1, 2016 to Non-Final Office Action dated Dec. 3, 2015", 14 pgs.

"U.S. Appl. No. 13/780,116, Response filed Apr. 27, 2015 to Non-Final Office Action dated Feb. 26, 2015", 12 pgs.

"U.S. Appl. No. 13/780,116, Response filed Sep. 30, 2015 to Final Office Action dated Jul. 30, 2015", 13 pgs.

"U.S. Appl. No. 13/780,116, Response filed Oct. 30, 2015 to Advisory Action dated Oct. 20, 2015", 11 pgs.

"U.S. Appl. No. 13/780,198, Advisory Action dated Oct. 21, 2015", 4 pgs.

"U.S. Appl. No. 13/780,198, Appeal Brief mailed Aug. 12, 2016", 31 pgs.

"U.S. Appl. No. 13/780,198, Appeal Decision mailed Sep. 5, 2017", 11 pgs.

"U.S. Appl. No. 13/780,198, Examiner Interview Summary dated May 5, 2016", 2 pgs.

"U.S. Appl. No. 13/780,198, Final Office Action dated May 12, 2016", 9 pgs.

"U.S. Appl. No. 13/780,198, Final Office Action dated Jul. 29, 2015", 30 pgs.

"U.S. Appl. No. 13/780,198, Non Final Office Action dated Jan. 15, 2015", 31 pgs.

"U.S. Appl. No. 13/780,198, Non Final Office Action dated Dec. 4, 2015", 13 pgs.

"U.S. Appl. No. 13/780,198, Reply Brief filed Jan. 12, 2017", 3 pgs.

"U.S. Appl. No. 13/780,198, Response filed Apr. 1, 2016 to Non-Final Office Action dated Dec. 4, 2015", 13 pgs.

"U.S. Appl. No. 13/780,198, Response filed Apr. 13, 2015 to Non Final Office Action dated Jan. 15, 2015", 16 pgs.

"U.S. Appl. No. 13/780,198, Response filed Sep. 29, 2015 to Final Office Action dated Jul. 29, 2015", 15 pgs.

(56) References Cited

OTHER PUBLICATIONS

"U.S. Appl. No. 13/780,198, Response filed Oct. 29, 2015 to Advisory Action dated Oct. 21, 2015", 17 pgs.

U.S. Appl. No. 15/795,706, filed Oct. 27, 2017, Inferring Skills Associated With a Job.

U.S. Appl. No. 15/404,846, filed Jan. 12, 2017, Applicant Skills Inference for a Job.

"U.S. Appl. No. 14/523,357, Ex Parte Quayle Action mailed Aug. 10, 2017", 6 pgs.

"U.S. Appl. No. 14/523,357, Non Final Office Action dated Feb. 9, 2017", 9 pgs.

"U.S. Appl. No. 14/523,357, Notice of Allowance dated Nov. 8, 2017", 10 pgs.

"U.S. Appl. No. 14/523,357, Response filed May 9, 2017 to Non Final Office Action dated Feb. 9, 2017", 9 pgs.

"U.S. Appl. No. 14/523,357, Response filed Oct. 10, 2017 to Ex Parte Quayle Action mailed Aug. 10, 2017", 9 pgs.

Shuo, Chang, et al., "Competition over timeline in social networks", IEEE, (2013), 494-501.

"Non Final Office Action Issued in U.S. Appl. No. 15/404,846", dated Nov. 26, 2018, 10 Pages.

"U.S. Appl. No. 15/404,846, Notice of Allowance dated May 22, 2019", 7 pgs.

"U.S. Appl. No. 15/795,706, Non Final Office Action dated Jul. 17, 2019", 16 pgs.

\* cited by examiner

↤ ↦ ⟳ ⌂ HTTP://WWW.SOCIALNETWORK.COM

PLAY! FRAMEWORK
WEB FRAMEWORK FOR JAVA AND SCALA

♡ SAVE TO MY LIST

70K JOBS ON SOCIAL NETWORK →

6 CONNECTIONS KNOW THIS SKILL

ASK ASHLEY ABOUT THIS SKILL ✉

| LEARNING CURVE | EASY |
|---|---|
| POPULARITY | 7% OF PEOPLE KNOW THIS SKILL |
| AVG. SALARY | $50K |

JOIN PLAY! GROUP ON SOCIAL NET!

OFFICIAL WEBSITE →
KHAN ACADEMY →
LYNDA.COM →
IMGTFY.COM →

SKILLS YOU MAY LIKE

ANGULAR JS
1 YEAR, 100K+ PEOPLE

FRONT END JAVASCRIPT FRAMEWORK →

FITNESS API
1 MONTH, 20K PEOPLE

API FOR ACTIVITY TRACKING AND REPORTING →

*FIG. 6*

TECHNIQUES FOR IDENTIFYING AND RECOMMENDING SKILLS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates an example user interface of a social networking application for making skill recommendations according to some examples of the present disclosure.

DETAILED DESCRIPTION

Figure 1:
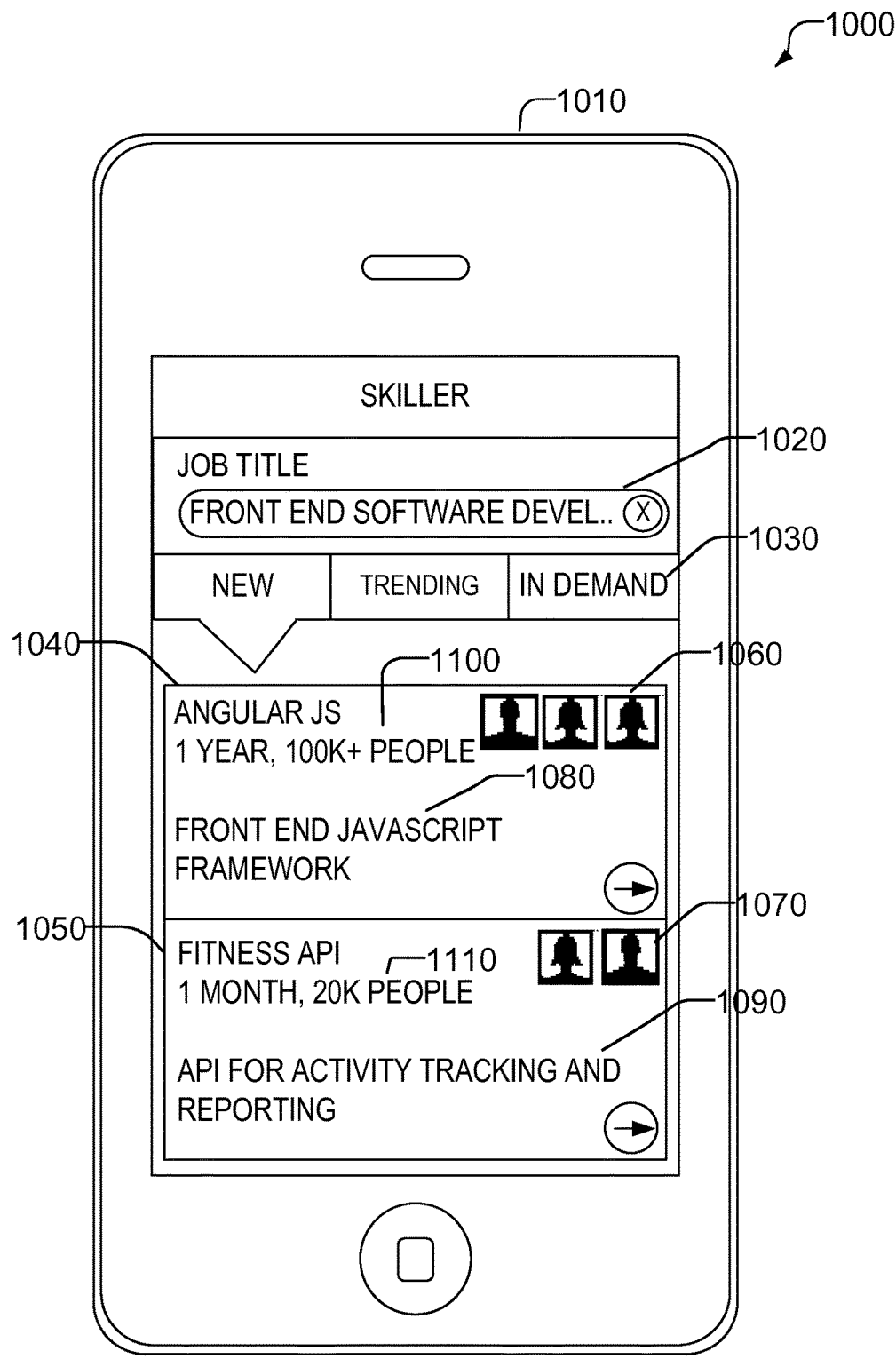
FIG. 1 illustrates an example user interface of a social networking application for making skill recommendations according to some examples of the present disclosure.

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service. The present inventive subject matter is generally applicable to a wide range of information services.

A social networking service is a service provided by one or more computer systems accessible over a network that allows members of the service to build or reflect social networks or social relations among members. Typically, members construct profiles, which may include personal information such as the member's name, contact information, employment information, photographs, personal messages, status information, multimedia, links to web-related content, blogs, and so on. In order to build or reflect these social networks or social relations among members, the social networking service allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of business networking purposes and a social networking service may likewise be used for business networking purposes as well as or in place of social networking purposes. A connection may be formed using an invitation process in which one member "invites" a second member to form a link. The second member then has the option of accepting or declining the invitation.

In general, a connection or link represents or is otherwise associated with an information access privilege, such that a first person who has established a connection with a second person is, via the establishment of that connection, authorizing the second person to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary greatly.

Some social networking services may offer a subscription or following process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other, connection based social networking services also may allow following type relationships as well. For example, the social networking service LinkedIn® allows members to follow particular companies.

Social networks may also provide various services to their members. One example such service is the formation of skill communities through the identification of member skills based upon information in their profiles. The formation and use of such skill communities is described in U.S. patent application Ser. No. 13/357,171 filed on Jan. 24, 2012 to Skomoroch et. al and entitled "SKILL EXTRACTION SYSTEM," which is hereby incorporated by reference in its entirety, U.S. patent application Ser. No. 13/357,302 filed on Jan. 24, 2012 to Skomoroch et. al. and entitled "SKILL RANKING SYSTEM," which is hereby incorporated by reference in its entirety, and U.S. patent application Ser. No. 13/357,360 filed on Jan. 24, 2012 to Skomoroch et. al. and entitled "SKILL CUSTOMIZATION SYSTEM," which is hereby incorporated by reference in its entirety. The referenced documents describe a social networking system that is able to automatically build a standardized list of skills, allow members to tag themselves with particular skills (or automatically tag members with particular skills), rank members with particular skills relative to one another with respect to that skill, and customize a user's experience on the social networking service based upon their skills.

While the skill communities provided are useful to allow for the creation of skill communities, so far they have been limited in terms of guiding users in achieving their goals. For example, the set of skills a user has does not inform a user what skills they should learn to accomplish a particular goal such as getting a promotion, a new job, accepted into a particular educational institution, or the like. The system described in this application can also be extended to other aspects of career development, besides skills. For example, the system can also analyze publications, patents, volunteer experiences, languages, life experiences, projects, certifications, examinations, courses, diplomas, awards, scholarships etc. and include them in its recommendations. This would help the user in not just figuring out a skill to learn but also in holistically planning their career.

Disclosed in some examples are methods, machine readable mediums, and systems for providing a list of skills a member should learn in order to achieve a particular goal. The system may provide a user interface to the member of the social networking service. Through the user interface, the member may select one or more goals that they wish to achieve. Based upon these goals, the list of skills associated with that goal may be determined—this list may be called a goal set of skills. The goal set of skills may be compared to the member's current skills. Skills in the list of goal skills that the member does not already possess may be recommended to the member. For descriptive convenience, the "member user" is a member of the social networking service who is the user of the application.

Goals may include various levels of granularity, from general to specific. For example, a general goal may be to display skills necessary for a job in general. A more specific goal may be to display skills necessary for a job at a particular company or location. Example goals may include:

a particular job in general (independent of the company and the location).

a particular job in a particular area.

a particular job at a particular company.

a particular job at a particular location and a particular company.

learning skills that are possessed by similar members related to a particular job.

Learning skills that a member should know to progress in their profession.

Example goals may also relate to Universities. For example, the user may wish to see the skills needed to better position a member for acceptance into a particular University, a particular program at the particular university and the like. Goals may also relate to careers generally, for example what skills are needed to progress in the member's current job.

The goal skill set may be determined from analysis of data in one or more data sources. The data sources used may be different depending on the selected goals of the member. For example, a group of skills possessed by a particular set of members may be utilized to create the goal set of skills. The particular set of members utilized to create the goal set of skills may be selected such that the members in the set have already achieved the particular goal of the user. For example, the set of members used to create the goal set of skills may be the set of all members who have a particular job, work at a particular company, live in a particular location, or a combination. In other examples, other data sources may be used, such as a set of skills associated with one or more job postings, career path trajectories of one or more members (e.g., skills associated with the members and the corresponding jobs over time), lists of skills corresponding to job titles, and the like.

For example if a particular member's goal is learning similar skills as their connections, the goal set of skills may be the set of all skills possessed by the connections of the particular member. In another example, if a particular member's goal is to learn skills necessary for a particular job, the social networking service may utilize the set of skills possessed by other members who have that job. The social networking service may collect all skills for a set of members who hold that job and then use the skills that appear above a predetermined threshold number of times in that set of members as the goal set of skills. Using only the skills that appear above a predetermined threshold number of times ensures that noise from skills not related to a particular job are filtered out. For example, if a member is interested in "Software Engineering," and the skills from the set of members who are software engineers (and the number of members listing it in their profile) is {C++ (50 members), Java (60 members), Underwater Basket Weaving (2 members)}. Underwater Basket Weaving may not appear in enough member profiles to be selected for inclusion in the goal set. In the previous example, the goal set of skills may be {C++, Java}. The set of members used to determine the goal set of skills may be general (e.g., all members) to specific (e.g., members who live in a particular location, work at a particular company, or both live in a particular location and work at a particular company). For example, if a member user is interested in a particular location, only members in that particular location and with that particular job may be used to determine the goal set of skills. Similarly, if the member user is interested in a particular company, the goal set of skills may be determined from only the members who work at that company and have that particular job.

In yet other examples, skill information for a particular job may be determined from other information, such as analysis of job openings associated with that job. In some examples, all job postings associated with the job may be used. In other examples, depending on the specificity of the goal, the job postings used may be specific to a company, location, or both a company and location. Skills for a particular job may be determined by textual analysis of the postings. Example textual analysis algorithms may include use of probabilistic latent semantic analysis algorithms, latent dirichlet allocation algorithms and the like. In other examples, employers posting job openings may pick one or more skills from a standardized list of skills to associate with the job opening. The system may then use these employer-entered skills. In yet other examples, the skills may be determined based upon job title. For example, the social networking service may have a standardized list of job titles and a list of skills corresponding to the job title (which may be derived based upon skills possessed by members with those job titles, or may be developed manually—e.g., through crowdsourcing).

In some examples, the goal skill set may be processed to ensure that only skills relevant to the particular goal are selected. For example, if a member's goal is to learn skills relevant to a particular job and the social networking system determines the goal set by collecting all the skills that other members possess that also hold the particular job, the collected set of skills may be noisy. The system may filter out all skills that do not appear in over a predetermined amount or percentage of member profiles in order to filter out noise.

Once the goal set and the member's skill set are determined the system may compare the two sets. Skills in the goal skill set that are not in the member's skill set may be added to a recommendation skill set.

Once the recommendation skill set has been determined the system may create one or more graphical user interfaces which include information about one or more skills in the recommendation skill set. Information may include the name of the skill, a difficulty level of the skill, and the like. The skills that are included in the graphical user interface may be based upon a view (e.g., a filter) selected by a user based upon the member user's selections. For example, a user may select "trending" skills—i.e., skills in the recommendation set that have been added the most by other members in a predetermined period of time. The user may select the "newest" skills—i.e., skills in the recommendation set that were added by a statistically significant number of members only recently, but that were not known to a significant number of people before that. This suggests that these skills may be new in the industry.

FIG. 1 illustrates an example user interface 1000 of a social networking application for making skill recommendations according to some examples of the present disclosure. FIG. 1 shows a mobile device 1010. The mobile device 1010 has been modified to include instructions which execute an application. The application may present one or more graphical user interfaces which present information and accept user input. Input box 1020 allows a member to input a goal. In this example, the goal is a job title and the member has entered "Front-end software developer." In some examples, job titles may be standardized such that the user of the application may enter in only a standardized job title. View selection tabs 1030 allows the member to switch between "New" skills related to a front end software developer, trending skills related to a front end software developer, and in-demand skills related to a front-end software developer. The New tab has been selected and two skills suggested for the member are shown. "Angular JS" 1040 and "Fitness API" 1050 are two skills suggested for the member. Additional skills suggested by the social networking service may be just off screen and accessible by a user interface control element such as a scroll bar. New skills may be determined from the recommendation set based on a determination that more than a predetermined number of profiles in total have added the skill in a predetermined amount of time, when less than a predetermined number of profiles in total had added that skill until before a predetermined amount of time. For example, if over less than 20 members have a particular skill listed on their profiles until last week, but more than 50 members have added this skill to their profiles within the last week, the skill may be considered new. The reason for using a small upper bound (20 in the given example) is to figure out which skills are new in the industry or network and are not known to many people. The reason for using a high lower bound (50 in the example) is to weed out any noise and allow only genuine skills to surface. Skills in the new view may be sorted based upon the number of members that have added the skill in the predetermined amount of time.

Also displayed in the user interface is information about the skill. For example, thumbnails of profile pictures of members that have the skill may be displayed 1060 and 1070, a skill description 1080, and 1090, and statistics 1100, 1110. Statistics may include one or more of: how "old" the skill is (e.g., when a first member of the social networking service first added the skill to their member profile), how many members know the skill, or how many members have added the skill in the predetermined amount of time. In some examples, the thumbnails of profile pictures 1060 and 1070 may be members that are connections of the member user.

Figure 2:
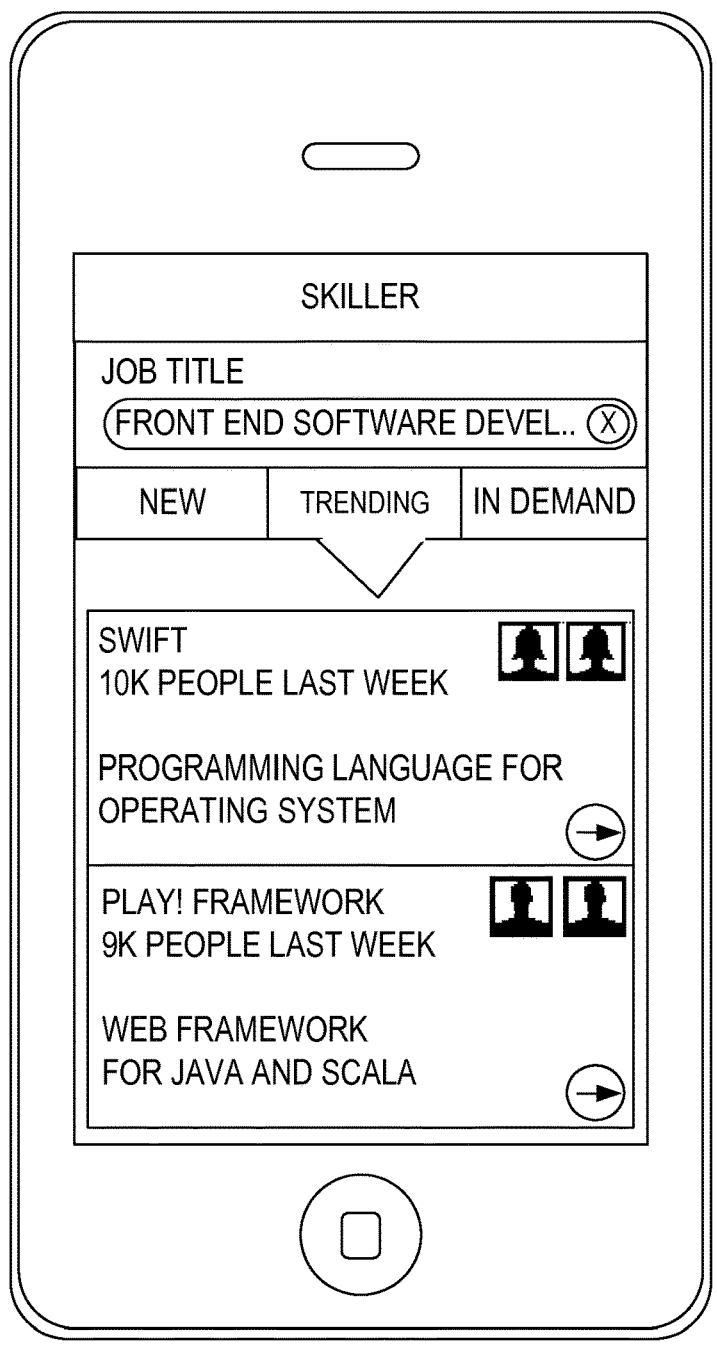
FIG. 2 illustrates an example user interface of a social networking application for making skill recommendations according to some examples of the present disclosure.

FIG. 2 illustrates an example user interface 2000 of a social networking application for making skill recommendations according to some examples of the present disclosure. In FIG. 2, the member has selected the "trending" view tab. Trending skills are those skills in the recommendation set for which the number of profiles in which the skill is listed has grown at a rate above a certain threshold. The skills displayed may be sorted by rate of growth. The trending tab may list statistics associated with the skills, such as the rate of growth, connections of the member user that have the skill, and the like.

Figure 3:
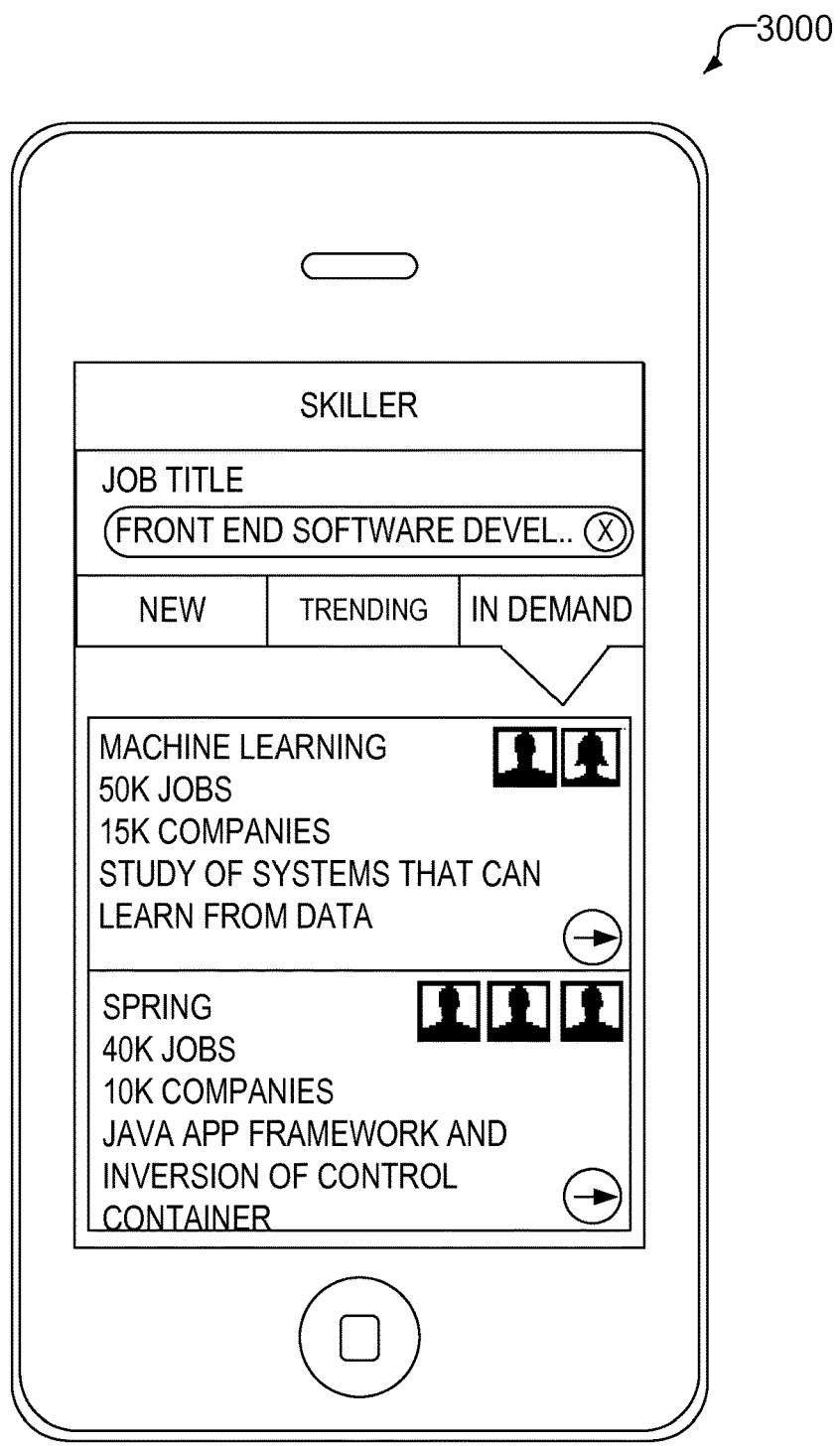
FIG. 3 illustrates an example user interface of a social networking application for making skill recommendations according to some examples of the present disclosure.

FIG. 3 illustrates an example user interface 3000 of a social networking application for making skill recommendations according to some examples of the present disclosure. In FIG. 3, the member has selected the "in-demand" view tab. In-demand skills are those that are sought by the highest paying or the highest number of job-postings associated with the job title, and in some cases the job title for job postings in a particular company, location or company and location. The skills may be sorted by the number of job listings requiring this skill. Although not specifically shown in FIG. 3, the member user may be presented with links that allow them to browse the job listings requiring the particular skill. In some examples, in the "in-demand" listing the number of companies which have job openings associated with the skill and/or the number of total jobs for that skill may be displayed.

Figure 4A:
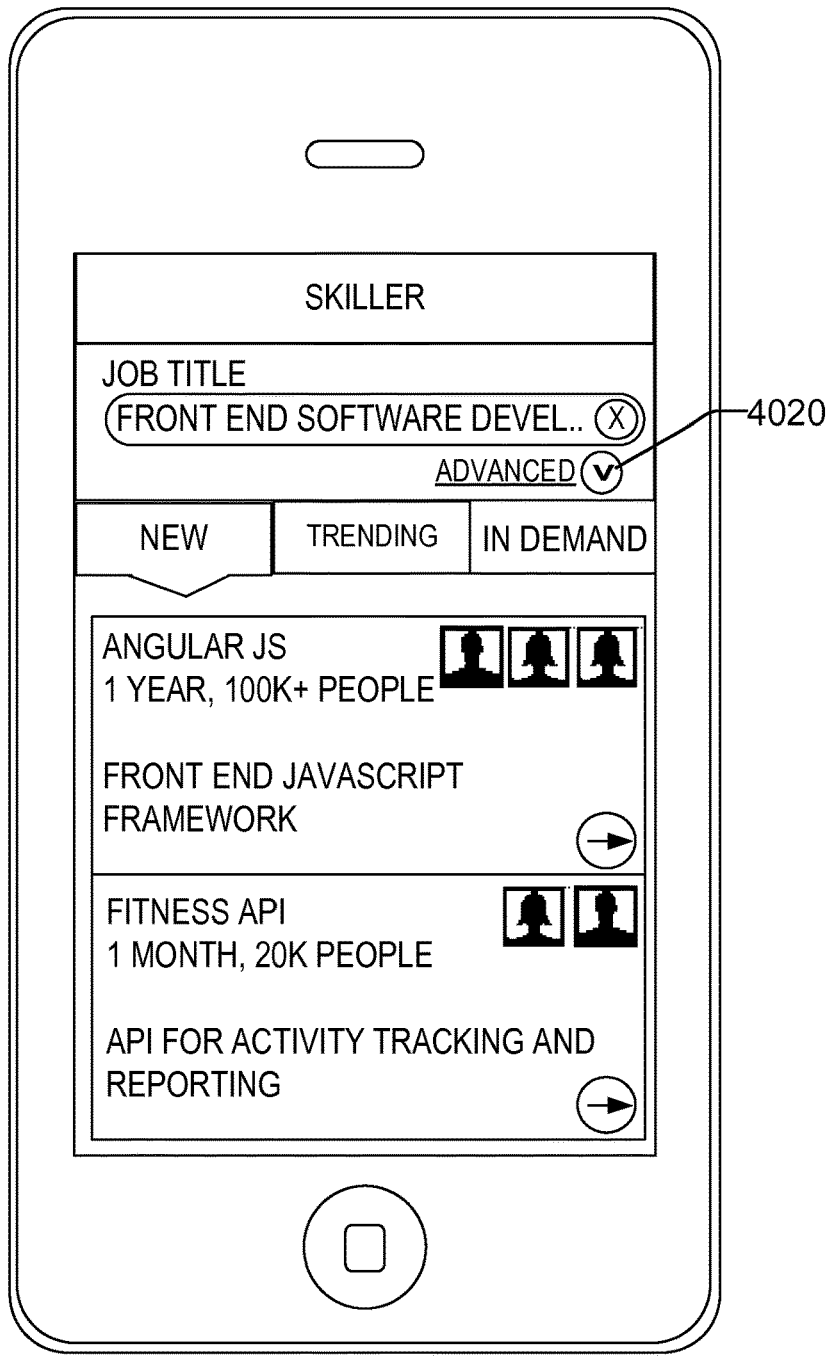
FIG. 4A and FIG. 4B illustrates two example user interfaces of a social networking application for making skill recommendations according to some examples of the present disclosure.
Figure 4B:
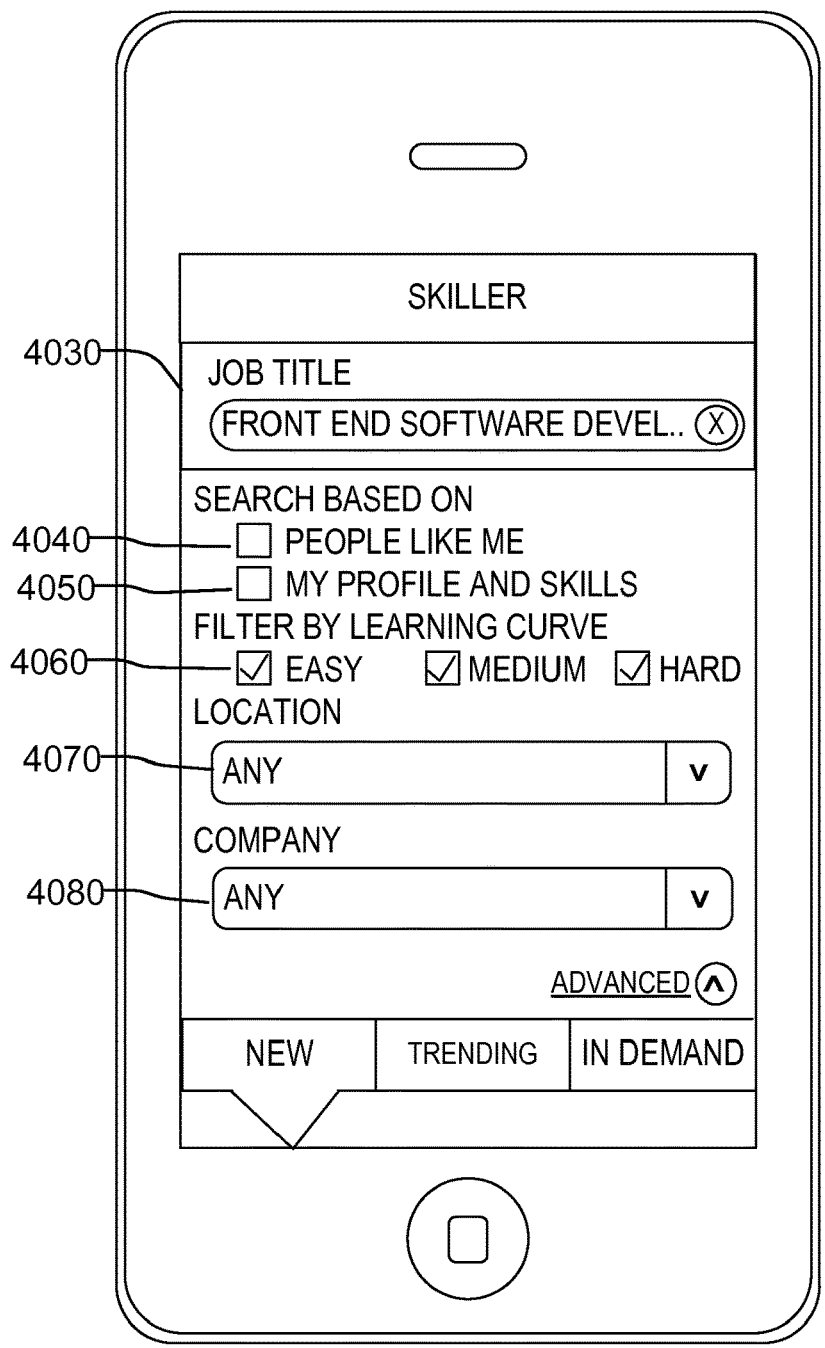

FIG. 4A and FIG. 4B illustrates two example user interfaces 4000 and 4100 of a social networking application for making skill recommendations. FIG. 4A illustrates an "advanced" search link 4020 in which users may specify additional information regarding their goals. Selecting the advanced search link 4020 may expand an advanced search interface 4030 shown in FIG. 4B 4100. Search options include additional options to narrow the member user's goals.

Options such as "people like me" 4040 which compares the skills of people comparable to the member with skills the member has. Members may be comparable by having similar job titles, similar skills, similar locations, or the like. To calculate the goal set of skills by using "people like me", first a set of input members into a clustering algorithm may be determined. The clustering algorithm may then cluster the set of input members such that members in the set of input members nearest to the member user are determined. The skills of the members nearest the user-member as determined by the clustering algorithm may be used as the goal set of skills. Other algorithms to determine similarity between members may also be used.

Clustering algorithms such as connectivity based clustering, centroid based clustering, distribution based clustering, density-based clustering, and the like may cluster similar members together using one or more of: job titles, similar skills, similar locations, similar educational backgrounds, and the like. In some examples, the input set of members used in the clustering algorithm is all members of the social networking service. In other examples the input set of members are all members who have the particular goal of the member. For example, all members who have the job title entered by the member user, the location (if any is selected) and the company (if any is selected). In other examples, the input set of members used in the clustering algorithm may be all members who attend an educational institution that is the goal of the member user. The goal-set is then determined based upon the set of skills possessed by the members of the set of members input into the clustering algorithm that were nearest the user-member as determined by the clustering algorithm. In some examples, the skills possessed by the members of the similar member set are filtered such that only skills appearing in a certain number or percentage of these members are included in the goal set so as to filter out noise.

Box 4050 may be used to select a goal to find the skills that the member should learn, based on their profile (e.g., skills the member already has, the member's job title, and seniority, and the like) and the entered goal. For example, the system may utilize the career trajectory data of the social networking service to suggest skills that the user should learn next. The career trajectory data may be an inventory of skills that a professional in a particular career or job may know broken down by a timeframe for acquiring the skill. These trajectories may be determined by mining the skill data for members. For example, for each job, the social networking service may determine an average set of skills for that job at each particular seniority level by using the skills in the member profiles of members who have that job and who are at the particular seniority level. Comparisons can be made between seniority levels to determine skill progression. The social networking service may compute the difference between the skills needed to obtain the next level and the skills of the member-user. These skills may be specific to the job title 4030, and in some examples based upon the location 4070 and 4080. For example, the career trajectory data may only consider members in this particular location or company.

Learning curve filter 4060 may filter out skills not meeting the learning curve criteria selected. Skills may be classified as skills that are easy to learn, hard to learn, or somewhere in-between (a medium learning curve). These skills may be classified as easy to learn, hard to learn, or in-between based upon crowd-sourcing techniques where users are polled about the skill when they add it to their profile.

Location filter 4070 may specify that the goal set of skills should only be determined based upon data (e.g., job listings, member profile data, and the like) from a particular location from being used to determine the set of goal skills. Locations may be as granular as desired, such as specific locations (e.g., a specific city), an area (e.g., a metropolitan area), a region, a country, a continent, or the like. Company filter 4080 may specify that the goal set of skills should only be determined based upon data (e.g., job listings, member profile data, and the like) from a particular selected company. This may be used by job seekers to learn which skills they should learn to have the best chances of landing a job for the particular job title 4030 at that company 4080.

Figure 5A:
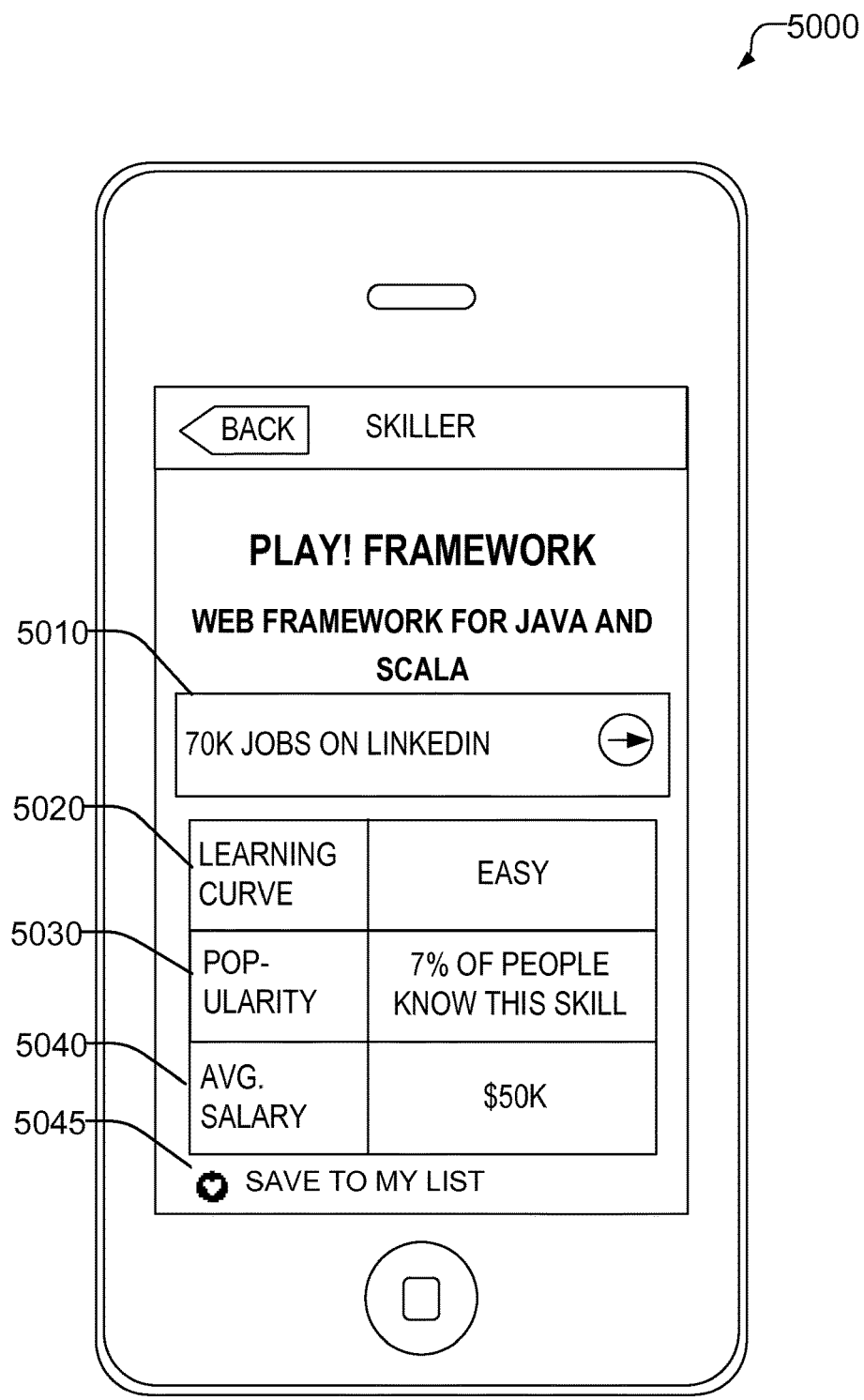
FIG. 5A and FIG. 5B illustrates two example user interfaces of a social networking application for making skill recommendations according to some examples of the present disclosure.
Figure 5B:
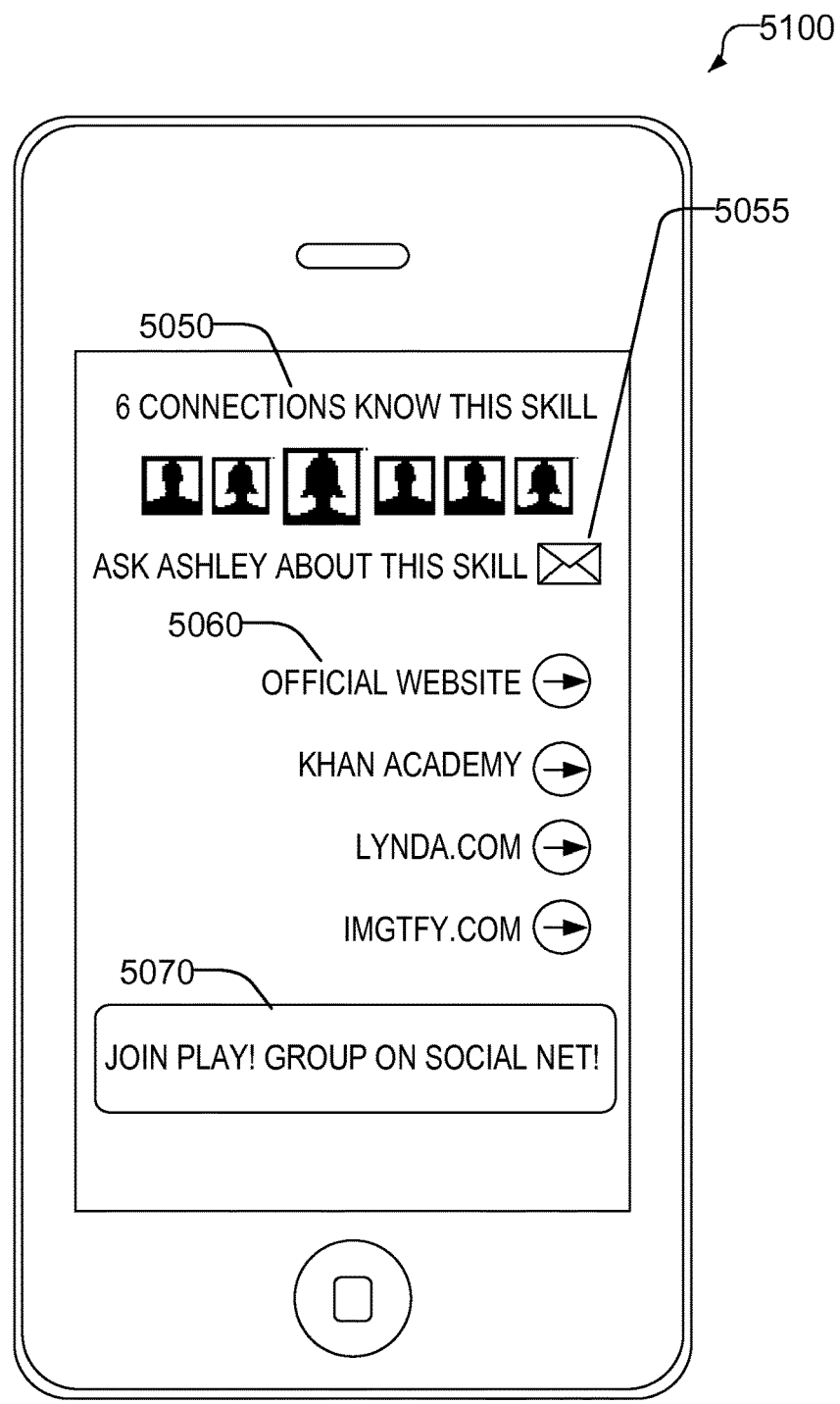

FIG. 5A and FIG. 5B illustrates two example user interfaces 5000 and 5100 of a social networking application for making skill recommendations according to some examples of the present disclosure. FIG. 5 shows a detail page which describes information and statistics about skills. This detail information may be accessed by selecting a skill in the various user interfaces shown in FIGS. 1-4. In the example shown, the skill is the "Play! Framework"® web framework for Java and Scala. Shown at 5010 is the number of jobs on the social networking service for which the skill is associated with. At 5020, the learning curve of the skill is displayed. At 5030 the popularity of the skill may be displayed. The skill popularity may be a percentage of users who know the skill. The percentage may be based upon the entire number of members on the social networking service, or may be based upon number of members who possess the member's goals. At 5040 an average salary for a person who has this skill may be determined and displayed. This may be determined based upon reported salaries of users having this skill. In some examples, instead of using reported salaries, average salary data for the job titles held by the members with this skill may be used. At 5045 a member user may save a particular skill to a favorite list of skills by clicking the "save to my list" link. Continuing with FIG. 5B, a list of connections of the member that have this skill may be displayed 5050. As shown in FIG. 5B, this list is displayed as thumbnails of images of the members taken from their profiles. FIG. 5B also selects one of these members and may provide a link so the member user may contact the selected member to learn more about the skill. FIG. 5B also shows various links to information about the skill 5060. The member may also be presented with one or more groups associated with the skill 5070 so they can get started learning the skill.

While the Figures have demonstrated example graphical user interface displays for a mobile device application, it will be appreciated by one of ordinary skill in the art with the benefit of Applicant's disclosure that graphical user interfaces for other devices are within the scope of the present disclosure. For example, applications designed for desktop computers, laptop computers, and the like. Applications may be stand-alone or browser based. FIG. 6 illustrates an example user interface 6000 of a social networking application for making skill recommendations according to some examples of the present disclosure. FIG. 6 shows a browser-based user interface showing the same fields previously described, but laid out for better presentation in a browser. The figure shows connections that know the skill, the skill learning curve, the skill popularity, the skill average salary, websites about the skill, groups associated with the skills, and other skills that may be recommended.

Figure 7:
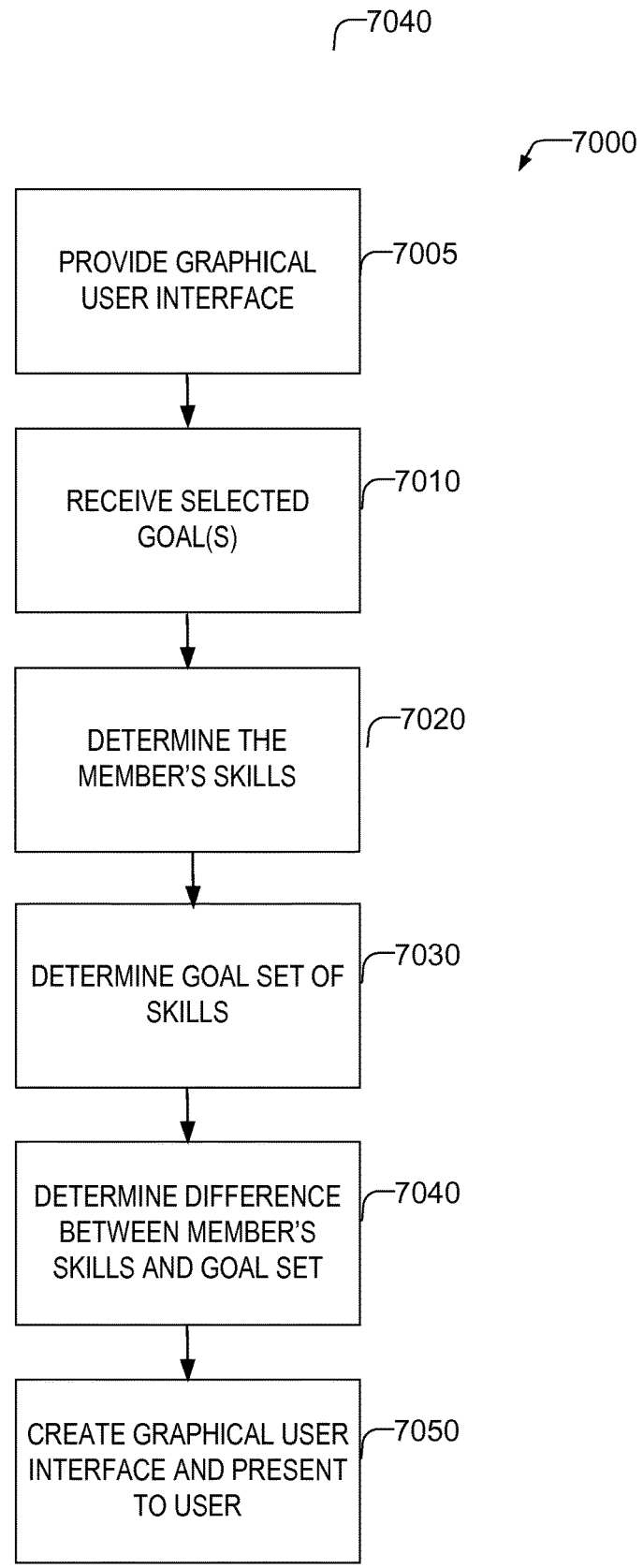
FIG. 7 shows a flowchart of a method of providing a graphical user interface which includes skills that a member should learn according to some examples of the present disclosure.

FIG. 7 shows a flowchart of a method 7000 of providing a graphical user interface which includes skills that a member should learn according to some examples of the present disclosure. At operation 7005 a graphical user interface may be created and provided to a member user. This graphical user interface may be or include elements from FIGS. 1-6. At operation 7010, the user may enter into the graphical user interface one or more goals that the user is interested in achieving. Example goals may include learning skills to obtain a job (e.g., "computer programmer"), work at a particular company (e.g., "computer programmer at company X"), learning skills necessary to attend a particular educational institution, learning skills necessary to progress in a current job, and the like. For example, the user may enter a job title in a text-input box.

At operation 7020, the set of skills that the member has may be determined. This set of skills may be determined by accessing skill information in a member profile of the member stored for the member by the social networking service. The skills the member has may be stored in the member profile and may be self-reported by the user or may be determined by the social networking service according to the job and educational information stored in the member profile.

At operation 7030, the goal set of skills may be determined. The goal set may be determined by accessing one or more data sources to determine the goal set of skills. Which data sources are accessed may depend on the particular goals of the member. Example data sources may include analysis of job postings, member profile data, and the like as previously explained. For example, the text of job postings associated with a job goal may be used to determine skills corresponding to the job. The set of job postings used may be limited by any location and company preferences selected by the user so that only job postings corresponding to the selected location and/or company may be used to determine the goal set of skills.

At operation 7040 the difference between the member's skills and the goal set of skills may be determined. This difference may be the skills that are in the goal set of skills that are not in the member's set of skills. This set of skills may be the set of skills that the user should learn to achieve their goals. At operation 7050, the system may create a graphical user interface to present the user which may include one or more of these skills the member should learn.

Figure 8:
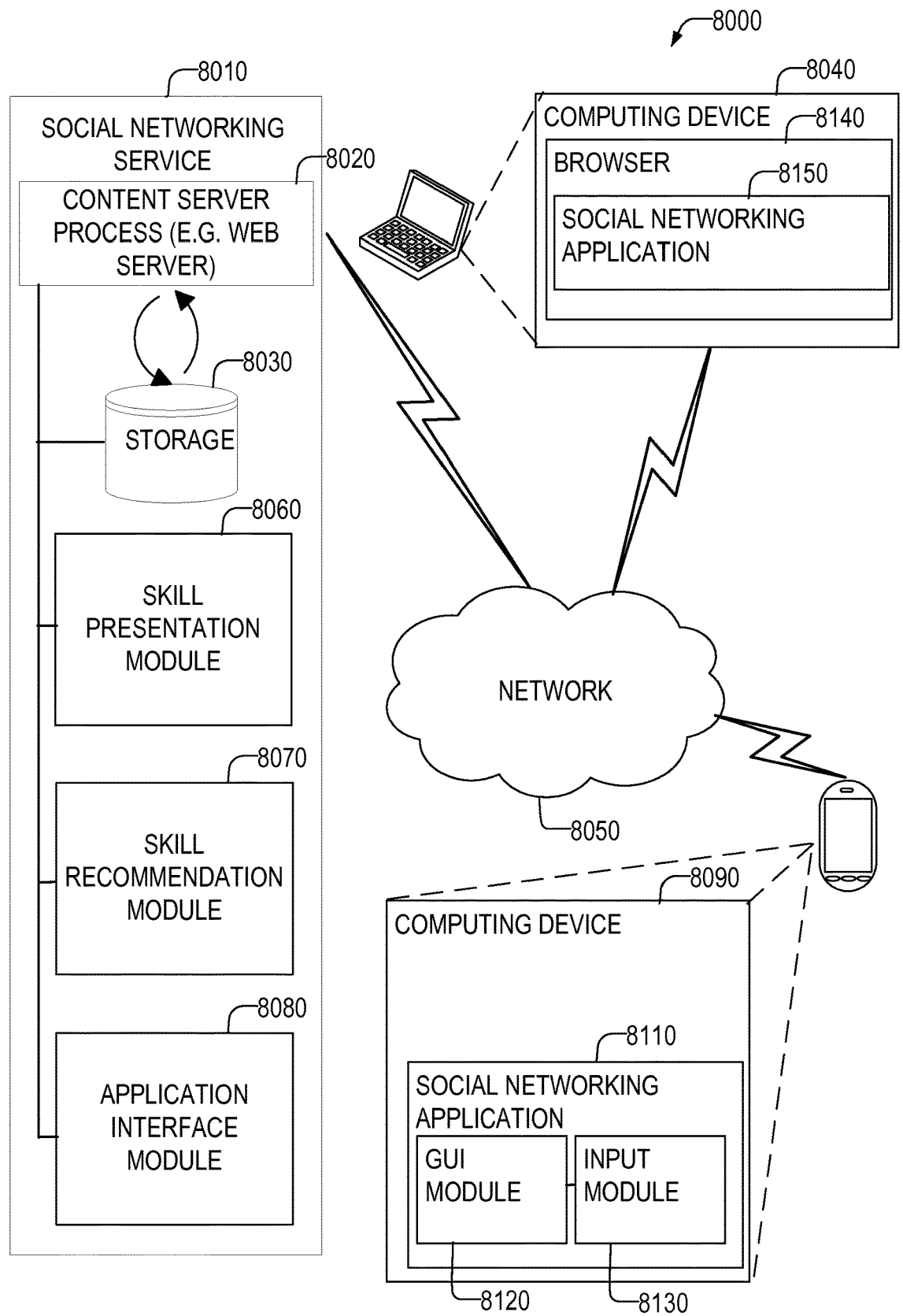
FIG. 8 shows a diagram of a social network system according to some examples of the present disclosure.

FIG. 8 shows a diagram of a social network system 8000 according to some examples of the present disclosure. Social networking service 8010 may contain a content server process 8020. Content server process 8020 may communicate with storage 8030 and may communicate with one or more computing devices 8040 and 8090 through a network 8050. Content server process 8020 may be responsible for the retrieval, presentation, and maintenance of member profiles stored in storage 8030 as well as the retrieval, creation, and presentation of a user interface for users. Content server process 8020 in one example may include or be a web server that fetches or creates internet web pages. Web pages may be or include Hyper Text Markup Language (HTML), eXtensible Markup Language (XML), JavaScript, or the like. The web pages may include portions of, or all of, a member profile at the request of users 8040. The content server process 8020 may also be responsible for allowing members to communicate with one another, establish connections, and post multi-media files (e.g., pictures, videos, and the like).

Users of computing devices 8040 and 8090 may include one or more members, prospective members, or other users of the social networking service 8010. Computing devices 8040 and 8090 communicate with social networking service 8010 through a network 8050. The network may be any means of enabling the social networking service 8010 to communicate data with computing devices 8040, 8090. Example networks 8050 may be or include portions of one or more of: the Internet, a Local Area Network (LAN), a Wide Area Network (WAN), wireless network (such as a wireless network based upon an IEEE 802.11 family of standards), a Metropolitan Area Network (MAN), a cellular network, or the like.

Computing device 8040 may be a laptop, desktop, tablet, cellphone or any other computing device which may provide a social networking application 8150 in conjunction with browser 8140. Social networking application 8150 may be one or more of hypertext markup language (HTML), javaScript, Java, or other browser executable objects that are executed within the browser 8140 to provide social networking functionality to a user. The social networking application 8150 may be deployed to the computing device 8040 by content server process 8020 through interaction with browser 8140.

Computing device 8090 may be a laptop, desktop, tablet, cellphone, or any other computing device which may provide a social networking functionality to the user through execution of a social networking application 8110. Social networking application 8110 may include a graphical user interface (GUI) module 8120 which may provide a graphical user interface output to a display which may show social networking information. Input and output module 8130 may accept input and process it in order to update the graphical user interface provided by the GUI module 8120. Input and output module 8130 may interface with the social networking service 8010 through the content server process 8020 or the application interface module 8080 using one or more application programming interfaces (APIs). For example input and output module may receive data related to the social networking service (e.g., member profile information, GUI information, and other data) by interfacing with application interface module 8080 through one or more application programming interfaces (APIs). Application interface module 8080, skill recommendation module 8070, skill presentation module 8060, storage 8030 and content server process 8020 may communicate with each other.

Both social networking applications 8150 and 8110 may provide social networking functionality to users in conjunction with content server process 8020 and application interface module 8080, and in some examples in conjunction with storage 8030 and skill recommendation module 8070. Social networking functionality may include viewing, editing, or deleting information in member profiles, communicating with other members, adding or removing skills, and the like.

Skill presentation module 8060 may build, or prepare information to allow the social networking applications 8110 and 8150 to build, one or more graphical user interfaces for presenting skill information and for presenting an interface to allow members to determine skills they should know. Skill presentation module 8060 may communicate with content server process 8020 and application interface module 8080 to deliver the graphical user interfaces (or information needed by the social networking application and/or the browser 8140 to build the graphical user interfaces) to computing devices 8040 and 8090. Skill presentation module 8060 may also receive user input from users of devices 8090 and 8040 from content server process 8020 and/or application interface module 8080. Skill presentation module 8060 may receive input from a user indicating a user's goals and requesting skills that they should learn to achieve the goal as well as other input. Skill presentation module 8060 may request the skill information from the skill recommendation module 8070. Skill recommendation module 8070 may determine the member's skills, determine the goal set of skills (based upon the goal), and determine the difference between the member's skills and the goal set.

The skill recommendation module 8070 may communicate this information to the skill presentation module 8060 which may prepare one or more graphical user interfaces to display this information and send those GUIs to computing devices 8040 or 8090. Skill presentation module 8060 may prepare any views requested by the user and provide statistics and other skill information.

Figure 9:
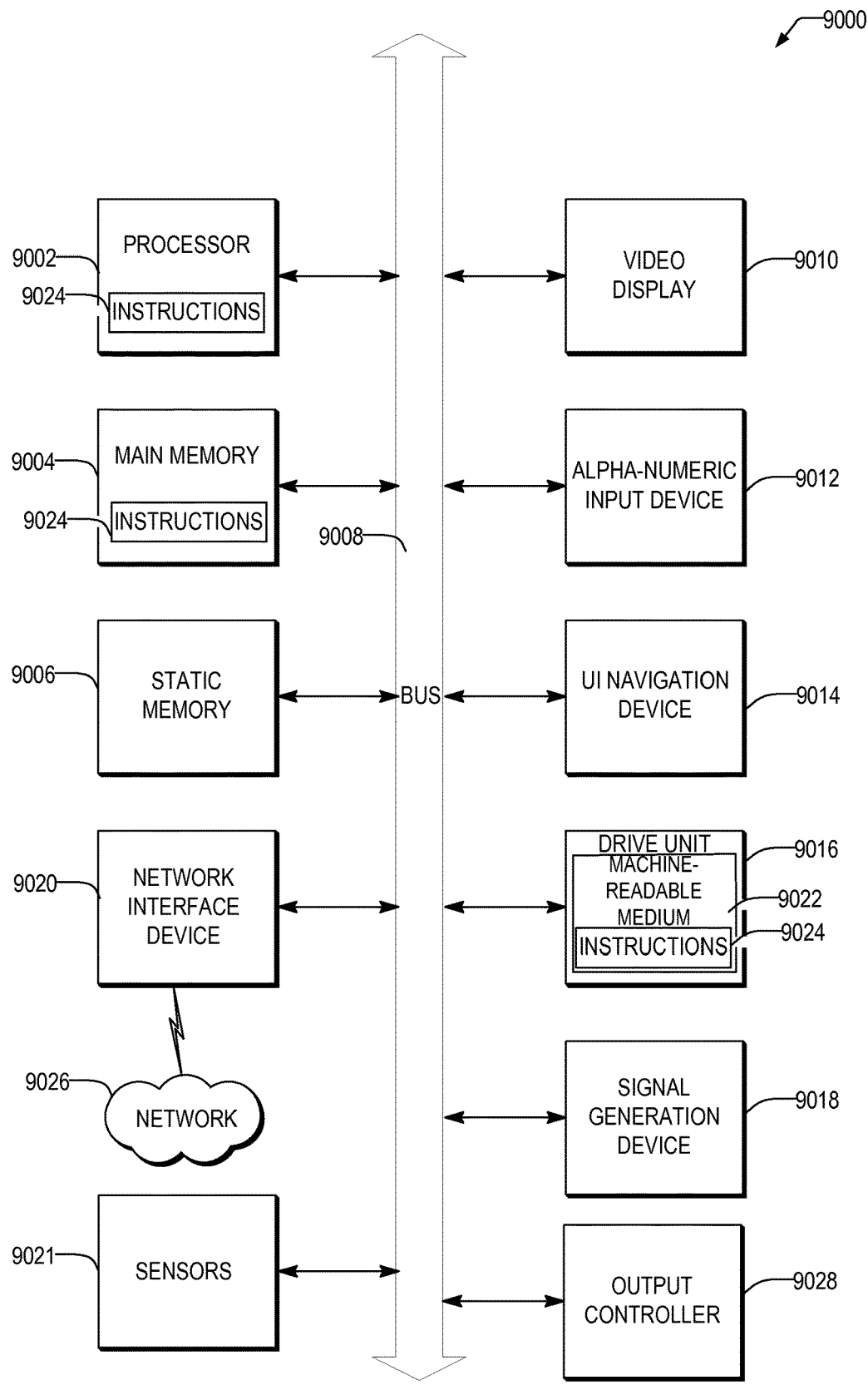
FIG. 9 is a block diagram illustrating an example of a machine upon which one or more embodiments may be implemented.

FIG. 9 illustrates a block diagram of an example machine 9000 upon which any one or more of the techniques (e.g., methodologies) discussed herein may perform. The components of FIG. 8 may execute upon and/or include one or more of the components in FIG. 9. In alternative embodiments, the machine 9000 may operate as a standalone device or may be connected (e.g., networked) to other machines. In a networked deployment, the machine 9000 may operate in the capacity of a server machine, a client machine, or both in server-client network environments. In an example, the machine 9000 may act as a peer machine in peer-to-peer (P2P) (or other distributed) network environment. The machine 9000 may be a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 9000 may include a hardware processor 9002 (e.g., a central processing unit (CPU), a graphics processing unit (GPU), a hardware processor core, or any combination thereof), a main memory 9004 and a static memory 9006, some or all of which may communicate with each other via an interlink (e.g., bus) 9008. The machine 9000 may further include a display unit 9010, an alphanumeric input device 9012 (e.g., a keyboard), and a user interface (UI) navigation device 9014 (e.g., a mouse). In an example, the display unit 9010, input device 9012 and UI navigation device 9014 may be a touch screen display. The machine 9000 may additionally include a storage device (e.g., drive unit) 9016, a signal generation device 9018 (e.g., a speaker), a network interface device 9020, and one or more sensors 9021, such as a global positioning system (GPS) sensor, compass, accelerometer, or other sensor. The machine 9000 may include an output controller 9028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 9016 may include a machine readable medium 9022 on which is stored one or more sets of data structures or instructions 9024 (e.g., software) embodying or utilized by any one or more of the techniques or functions described herein. The instructions 9024 may also reside, completely or at least partially, within the main memory 9004, within static memory 9006, or within the hardware processor 9002 during execution thereof by the machine 9000. In an example, one or any combination of the hardware processor 9002, the main memory 9004, the static memory 9006, or the storage device 9016 may constitute machine readable media.

While the machine readable medium 9022 is illustrated as a single medium, the term "machine readable medium" may include a single medium or multiple media (e.g., a centralized or distributed database, and/or associated caches and servers) configured to store the one or more instructions 9024.

The term "machine readable medium" may include any medium that is capable of storing, encoding, or carrying instructions for execution by the machine 9000 and that cause the machine 9000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 9024 may further be transmitted or received over a communications network 9026 using a transmission medium via the network interface device 9020. The Machine 9000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 9020 may include one or more physical jacks (e.g., Ethernet, coaxial, or phone jacks) or one or more antennas to connect to the communications network 9026. In an example, the network interface device 9020 may include a plurality of antennas to wirelessly communicate using at least one of single-input multiple-output (SIMO), multiple-input multiple-output (MIMO), or multiple-input single-output (MISO) techniques. In some examples, the network interface device 9020 may wirelessly communicate using Multiple User MIMO techniques.

What is claimed is:

1. A method for recommending a skill to a member of a social networking service, the method comprising:
   using one or more hardware processors of a social networking service:
      determining a first set of skills from a member profile data structure corresponding to the member, the first set of skills being a subset of a standardized list of skills;
      receiving a selected goal of the member through a user interface at least partially provided by the social networking service;
      determining an input set of members, the input set of members comprising a set of one or more other members of the social networking service that have achieved the selected goal, wherein each member of the input set of members has an associated member profile and wherein each associated member profile includes at least one skill wherein including the at least one skill in the associated member profile signifies the associated member has achieved the at least one skill;
      determining a second set of skills, the second set of skills being a second subset of a standardized list of skills, wherein the second set of skills is determined, for each respective skill in the standardized list of skills, by:
         analyzing the member profiles of the input set of members to determine a quantity of member profiles from the input set of members that include the respective skill;
         analyzing the member profiles of the input set of members at a previous point in time to determine a previous quantity of member profiles from the input set of members that include the respective skill;
         comparing the quantity to the previous quantity to determine the member profiles that include the respective skill among member profiles has grown at a rate above a predetermined threshold; and
         adding the respective skill to the second set of skills;
      determining a third set of skills that is the difference between the first and second sets of skills;
      generating a graphical user interface including the third set of skills;
      generating, for the graphical user interface, selectable options of the third set of skills, wherein the selectable options include a trending set, an in-demand set, and a recent set, wherein the trending set is the third set of skills ranked by rate of growth among member profiles of the input set of members, the in-demand set is the third set of skills ranked based on a total of job postings on the social networking service which require a respective skill, and the recent set is the third set of skills ranked based on a date a respective skill was added to an associated member profile of the input set of members; and
      presenting the graphical user interface to the member, wherein the selectable options of the trending set, the in-demand set, and the recent set are selectable for display by a user.

2. The method of claim 1, wherein the skills that are possessed by the input set of members comprise skills corresponding to a job held by the member.

3. The method of claim 1, wherein the skills that are possessed by the input set of members comprise self-identified skills.

4. The method of claim 1, wherein the selected goal is one of:
   a desired job, a desired career, a desired educational institution, a certification, and a higher skill level.

5. The method of claim 1, comprising:
   receiving, by a graphical user interface, a view selection by the member; and
   wherein generating the graphical user interface including at least one of the skills in the third set of skills comprises selecting the at least one of the skills in the third set of skills responsive to the at least one of the skills matching a criterion associated with the view selection.

6. The method of claim 5, wherein the view selection is one or more of location, learning curve, and company.

7. The method of claim 1, wherein generating a graphical user interface including at least one of the skills in the third set of skills comprises including on the graphical user interface at least one property of the skill.

8. The method of claim 7, wherein the at least one property of the skill comprises one of:
   a learning curve of the skill, a popularity of the skill, an average salary of the skill, a connection of the member that possesses the skill, or a Universal Resource Locator of a website that is associated with the skill.

9. A social networking service for recommending a skill to a member of the social networking service, the service comprising:
   one or more computer processors configured to perform operations comprising:
      determining a first set of skills from a member profile data structure corresponding to the member, the first set of skills being a subset of a standardized list of skills;
      receiving a selected goal of the member through a user interface at least partially provided by the social networking service;

determining an input set of members, the input set of members comprising a set of one or more other members of the social networking service that have achieved the selected goal, wherein each member of the input set of members has an associated member profile and wherein each associated member profile includes at least one skill wherein including the at least one skill in the associated member profile signifies the associated member has achieved the at least one skill;

determining a second set of skills, the second set of skills being a second subset of a standardized list of skills, wherein the second set of skills is determined, for each respective skill in the standardized list of skills, by:

analyzing the member profiles of the input set of members to determine a quantity of member profiles from the input set of members that include the respective skill;

analyzing the member profiles of the input set of members at a previous point in time to determine a previous quantity of member profiles from the input set of members that include the respective skill;

comparing the quantity to the previous quantity to determine the member profiles that include the respective skill among member profiles has grown at a rate above a predetermined threshold; and adding the respective skill to the second set of skills;

determining a third set of skills that is the difference between the first and second sets of skills;

generating a graphical user interface including the third set of skills;

generating, for the graphical user interface, selectable options of the third set of skills, wherein the selectable options include a trending set, an in-demand set, and a recent set, wherein the trending set is the third set of skills ranked by rate of growth among member profiles of the input set of members, the in-demand set is the third set of skills ranked based on a total of job postings on the social networking service which require a respective skill, and the recent set is the third set of skills ranked based on a date a respective skill was added to an associated member profile of the input set of members; and presenting the graphical user interface to the member, wherein the selectable options of the trending set, the in-demand set, and the recent set are selectable for display by a user.

10. The service of claim 9, wherein the skills that are possessed by the input set of members comprise skills corresponding to a job held by the member.

11. The service of claim 10, wherein the skills that are possessed by the input set of members comprise self-identified skills.

12. The service of claim 9, wherein the selected goal is one of:
a desired job, a desired career, a desired educational institution, a certification, and a higher skill level.

13. The service of claim 9 wherein the operations comprise:
receiving by a graphical user interface, a view selection by the member; and
wherein generating the graphical user interface including at least one of the skills in the third set of skills comprises selecting the at least one of the skills in the third set of skills responsive to the at least one of the skills matching a criterion associated with the view selection.

14. The service of claim 13, wherein the view selection is one or more of location, learning curve, and company.

15. The service of claim 9, wherein generating the graphical user interface including at least one of the skills in the third set of skills by at least including on the graphical user interface at least one property of the skill.

16. The service of claim 15, wherein the at least one property of the skill comprises one of:
a learning curve of the skill, a popularity of the skill, an average salary of the skill, a connection of the member that possesses the skill, or a Universal Resource Locator of a website that is associated with the skill.

17. A non-transitory machine-readable medium, including instructions, which when executed by the machine, causes the machine to perform operations for recommending a skill to a member of a social networking service, the operations comprising:

determining a first set of skills from a member profile data structure corresponding to the member, the first set of skills being a subset of a standardized list of skills;

receiving a selected goal of the member through a user interface at least partially provided by the social networking service;

determining an input set of members, the input set of members comprising a set of one or more other members of the social networking service that have achieved the selected goal, wherein each member of the input set of members has an associated member profile and wherein each associated member profile includes at least one skill wherein including the at least one skill in the associated member profile signifies the associated member has achieved the at least one skill;

determining a second set of skills, the second set of skills being a second subset of a standardized list of skills, wherein the second set of skills is determined, for each respective skill in the standardized list of skills, by:

analyzing the member profiles of the input set of members to determine a quantity of member profiles from the input set of members that include the respective skill;

analyzing the member profiles of the input set of members at a previous point in time to determine a previous quantity of member profiles from the input set of members that include the respective skill;

comparing the quantity to the previous quantity to determine the member profiles that include the respective skill among member profiles has grown at a rate above a predetermined threshold; and adding the respective skill to the second set of skills;

determining a third set of skills that is the difference between the first and second sets of skills;

generating a graphical user interface including the third set of skills;

generating, for the graphical user interface, selectable options of the third set of skills, wherein the selectable options include a trending set, an in-demand set, and a recent set, wherein the trending set is the third set of skills ranked by rate of growth among member profiles of the input set of members, the in-demand set is the third set of skills ranked based on a total of job postings on the social networking service which require a respective skill, and the recent set is the third set of skills ranked based on a date a respective skill was added to an associated member profile of the input set of members; and presenting the graphical user interface to the member, wherein the selectable options of the trending set, the in-demand set, and the recent set are selectable for display by a user.

18. The machine-readable medium of claim 17, wherein the skills that are possessed by the input set of members comprise skills corresponding to a job held by the member.

19. The machine-readable medium of claim 18, wherein the skills that are possessed by the input set of members comprise self-identified skills.

20. The machine-readable medium of claim 17, wherein the selected goal is one of:

a desired job, a desired career, a desired educational institution, a certification, and a higher skill level.

21. The machine-readable medium of claim 17, wherein the operations comprise:

receiving, by a graphical user interface, a view selection by the member; and wherein generating the graphical user interface including at least one of the skills in the third set of skills comprises selecting the at least one of the skills in the third set of skills responsive to the at least one of the skills matching a criterion associated with the view selection.

22. The machine-readable medium of claim 21, wherein the view selection is one or more of location, learning curve, and company.

23. The machine-readable medium of claim 17, wherein the operations of generating a graphical user interface includes including at least one of the skills in the third set of skills comprises including on the graphical user interface at least one property of the skill.

24. The machine-readable medium of claim 23, wherein the at least one property of the skill comprises one of:

a learning curve of the skill, a popularity of the skill, an average salary of the skill, a connection of the member that possesses the skill, or a Universal Resource Locator of a website that is associated with the skill.

* * * * *